United States Patent [19]

Wolga et al.

[11] 3,914,055

[45] Oct. 21, 1975

[54] INSTRUMENT FOR HIGH RESOLUTION SPECTRAL ANALYSIS WITH LARGE OPTICAL THROUGHPUT

[75] Inventors: George J. Wolga; Ross A. McFarlane, both of Ithaca, N.Y.

[73] Assignee: Lansing Research Corporation, Ithaca, N.Y.

[22] Filed: May 23, 1974

[21] Appl. No.: 472,910

[52] U.S. Cl. .............................. 356/75; 356/106 IS
[51] Int. Cl.² ........................ G01J 3/44; G01B 9/02
[58] Field of Search ................ 356/75, 106 IS, 112

[56] References Cited
UNITED STATES PATENTS

| | | | |
|---|---|---|---|
| 3,358,243 | 12/1967 | Collins, Jr. et al. | 356/112 |
| 3,373,651 | 3/1968 | Mack et al. | 356/112 |
| 3,498,693 | 3/1970 | Fein et al. | 356/112 |
| 3,853,404 | 12/1974 | Barrett | 356/75 |

*Primary Examiner*—Vincent P. McGraw

[57] ABSTRACT

A spectroscopic apparatus for the measurement of the spectral characteristics of weak light sources, for example laser Raman scattering from liquids, is formed of a tunable acousto-optical filter followed by a Fabry-Perot Etalon. Circuits are provided for tuning the two devices to the same light frequency or wavelength. The acousto-optical filter eliminates most of the light other than that of a particular wavelength while the etalon eliminates still more of the light other than that of the wavelength to which the device is tuned. The optical throughput of the two devices is so high that a very much greater proportion of the light of the particular wavelength from any source can be passed through the combination than through other devices of similar resolving power.

In a preferred form of the invention, there are used two etalons in series with a TOF. The etalons have substantially different free spectral ranges, and these spectral ranges are so selected that the lowest common multiple is several times the higher of the two free spectral ranges, and that the difference between the free spectral ranges is great enough so that when they coincide at one wavelength their wavelengths are substantially different at neighboring peaks.

11 Claims, 21 Drawing Figures

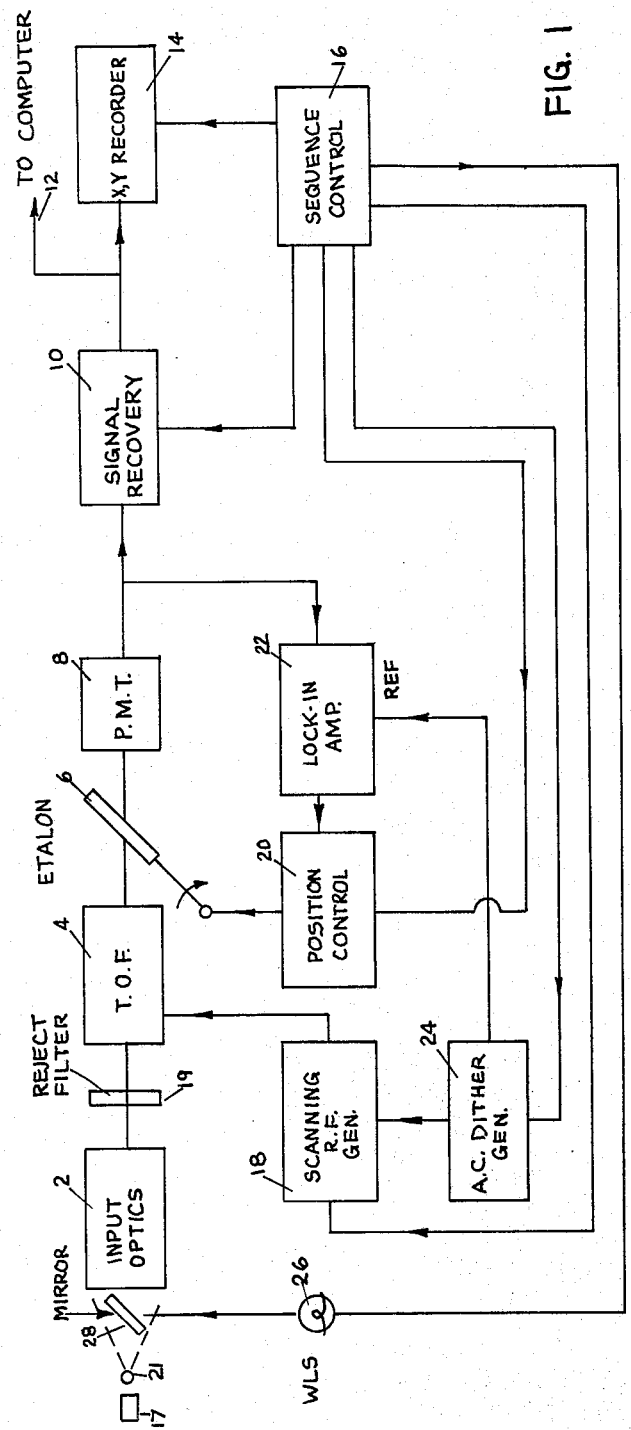
FIG. 1
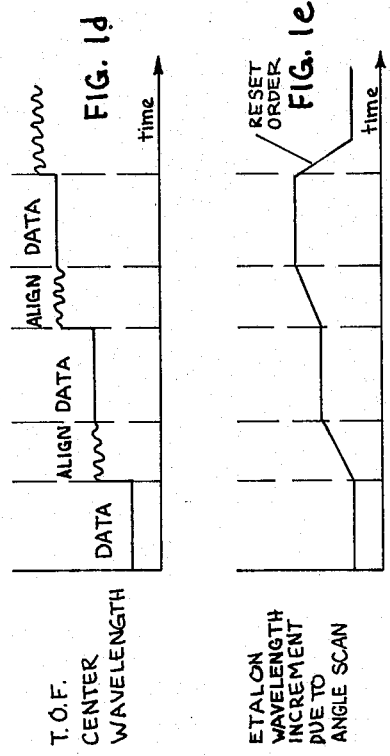
FIG. 1d
FIG. 1e
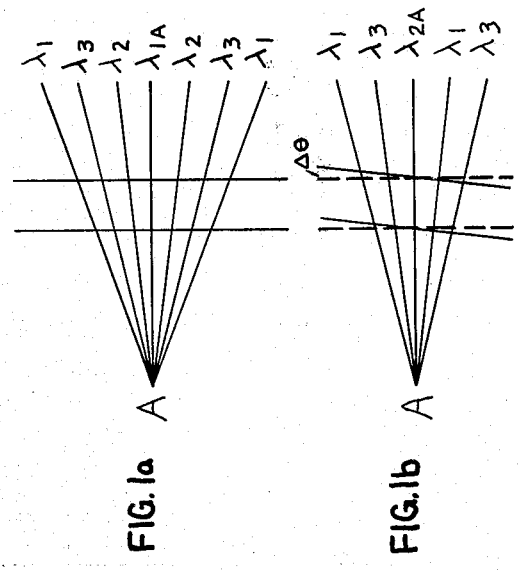
FIG. 1a
FIG. 1b

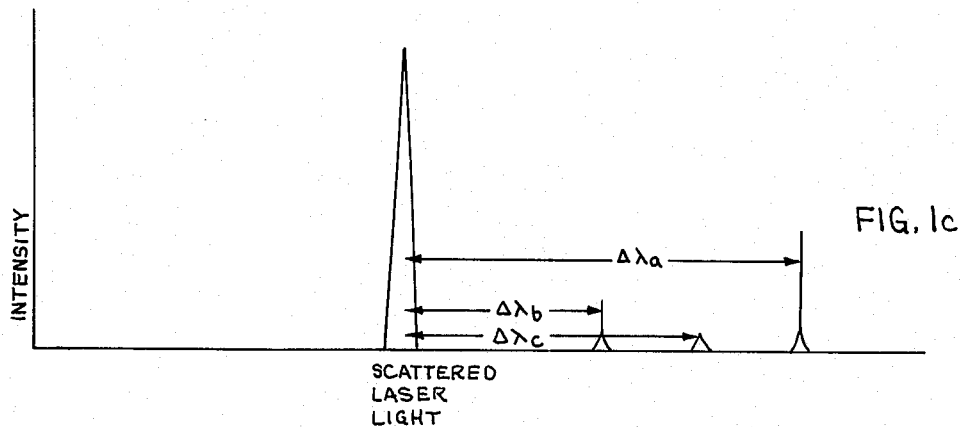
FIG. 1c
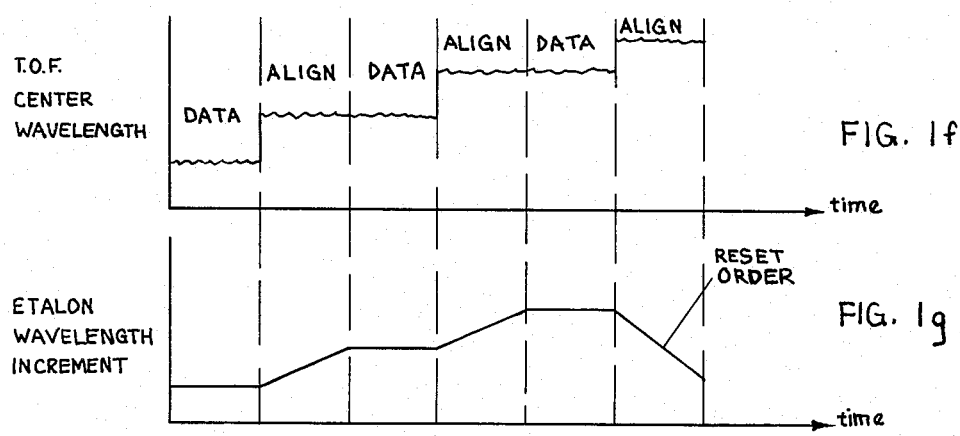
FIG. 1f
FIG. 1g
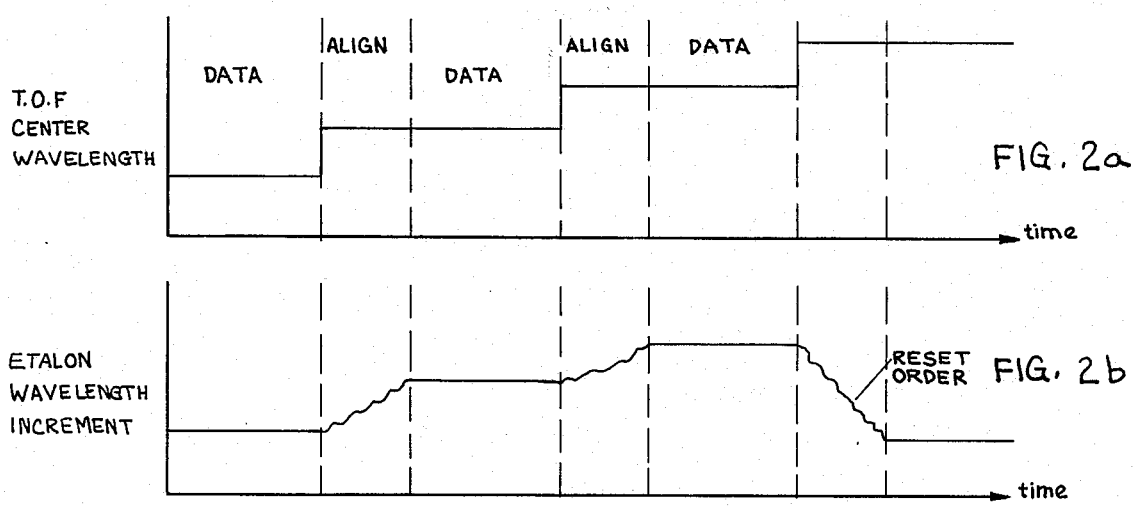
FIG. 2a
FIG. 2b

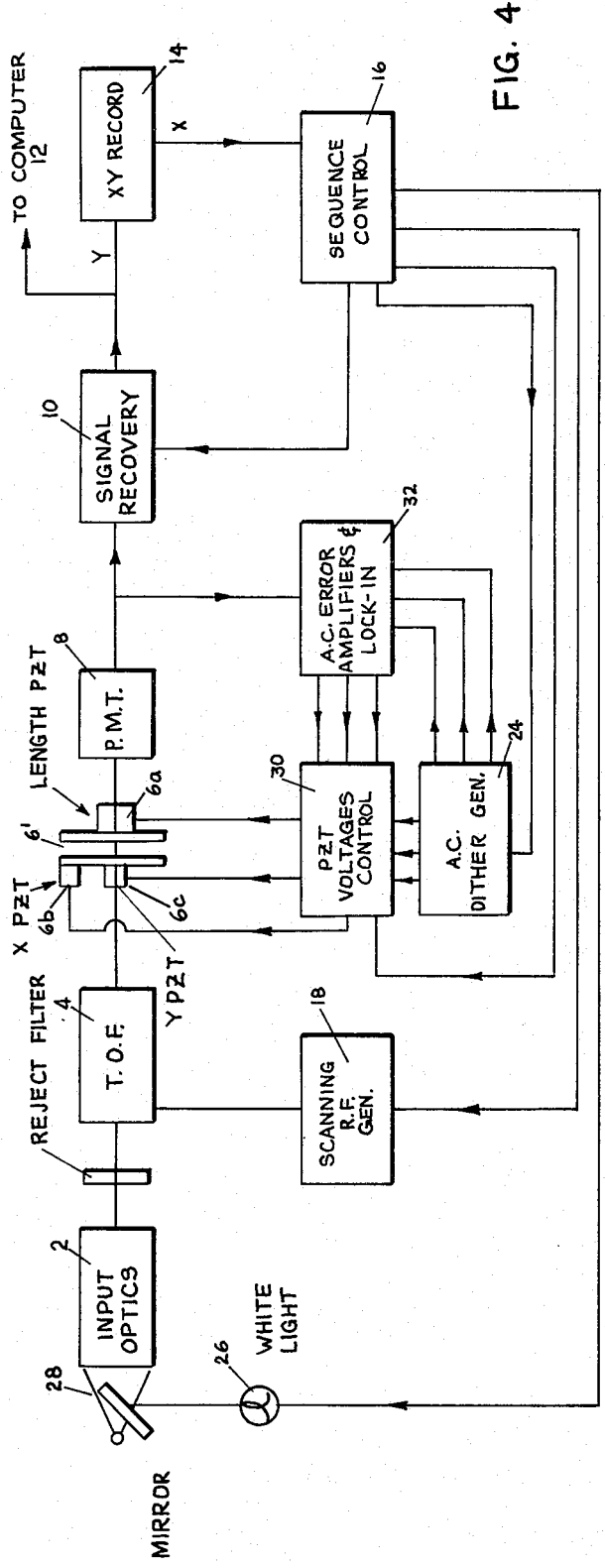
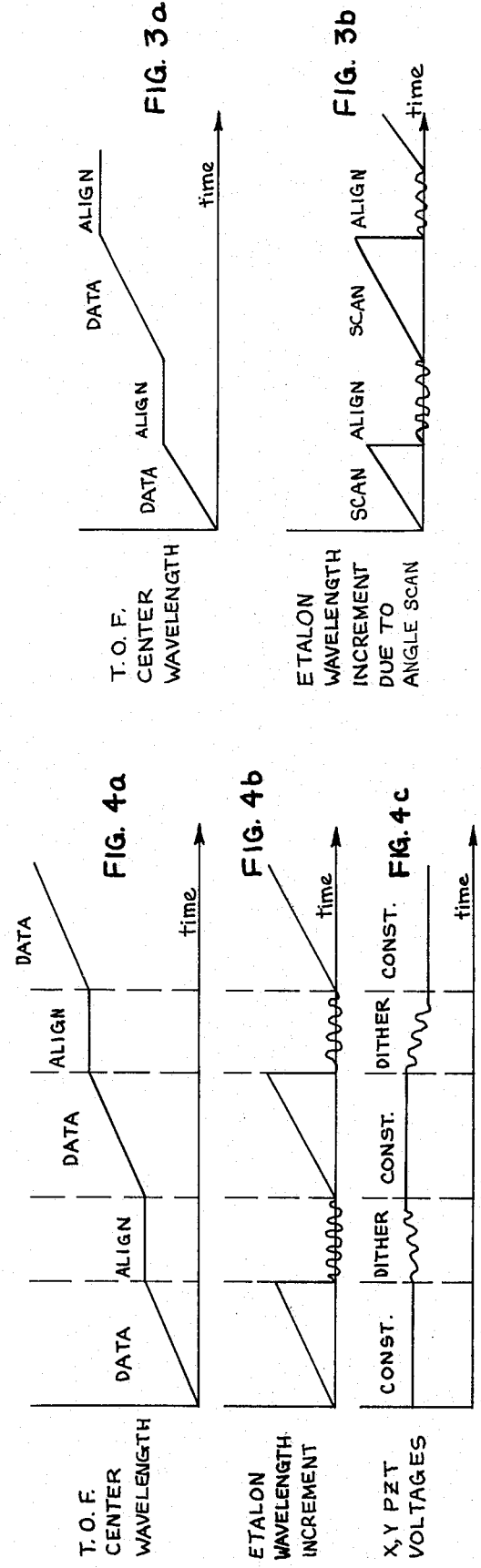

3,914,055

INSTRUMENT FOR HIGH RESOLUTION SPECTRAL ANALYSIS WITH LARGE OPTICAL THROUGHPUT

BACKGROUND OF THE INVENTION

1. Field of the Invention

The invention relates to a spectroscopic apparatus for the measurement of the spectral characteristics of weak light signals with high resolution.

2. The Prior Art

The detection of light signals often requires a means for dispersion of the frequency spectrum of the light to permit selective determination of this spectrum. Traditionally, this dispersion is carried out by use of refracting prisms or diffraction gratings, associated with narrow slits and a mirror system when the frequency spectrum of the light signal is broad. The combination of elements just described bear the names monochromator, spectrometer or spectrograph with the prefix prism or grating. These devices are often ganged together to operate in series for the purpose of increasing the contrast level between the desired signal and the background that results from the imperfections inherent in the optical elements employed. When thus ganged they are referred to as double or triple monochromators, and so on. The ganged double or triple monochromator has, for example, become the standard instrument for recording the low intensity spectra resulting from Raman scattering by liquids, gases and solids. These instruments are characterised by relatively low light throughput, large size, relatively slow tuning, back-lash in internal gearing systems leading to difficulties in resetting to a particular wavelength, and in the lack of simple means of digitally commanding the instrument or extracting digital wavelength information from the recorded spectra.

SUMMARY OF THE INVENTION

It is the purpose of this invention to provide the design, features, and operation of instruments that overcome all of the above mentioned limitations.

The instruments to be disclosed in this specification perform high resolution spectral analysis with large optical throughput. For many applications such as detection of scattered light the resolving power and optical throughput exceed by far the comparable performance figures of conventional instrumentation. The term "Spectral Analysis" as used herein means the selection of a portion of the entire spectrum of a light source, rejection of the remainder of the spectrum, the ability to specify the spectral location of the selected portion, and either detection of the selected portion of transmission of it to other apparatus. As such, the instruments to be disclosed may be applied as an optical filter or as an optical spectrum analyzer with application to the measurement of absorption, emission or scattered light spectra.

The amount of light can be transmitted through any optical device is proportional to the produce of input aperture area and the solid angle accepted by any point in the aperture. This product is called the etendue and defined $\eta =$ ETENDUE $= A \, \omega$(area $x$ steradians)

where A is the device aperture.

$\omega$ is the solid angle of acceptance.

The present instruments derive their very significant performance advantage over double or triple monochromators from the very substantially greater values of etendue that can be achieved for comparable spectral resolution.

The instruments disclosed here combine an acousto-optic tunable optical filter (TOF) with one or more etalons and means for scanning and synchronizing the combined response of these elements placed in series. Both the TOF and etalon have large etendue. The etalon can also be simultaneously operated with high resolving power and large etendue. in series combination, the TOF plus the etalon provide high resolution with large optical throughput.

A need for synchronizing the TOF and etalon arises as follows: The TOF has a single passband transmission function that can be electronically tuned over a large bandwidth (~3000A). The etalon has a multiple, periodic passband transmission function whose period is called a free spectral range (FSR). The passband of the TOF is wider than the individual passbands of the etalon, and the etalon can be designed so that the distance between its transmission peaks is greater than the width of the passband of the TOF. Thus, when the passband of the TOF is known, the particular peak of the etalon is also known, and the wavelength of light transmitted through the two filtering devices can thus be determined.

Tuning of each etalon transmission peak over the interval between successive peaks can be accomplished in several ways. For series operation of these devices a single peak of the etalon must be maintained in tune with the TOF while both are scanned over a desired spectral region. The means of accomplishing these functions are described below.

A tuned acousto-optical filter is basically a crystal in which an acoustic wave is launched which propagates along the rod and the light beam to be analyzed propagates colinearly with the acoustical wave. A polarizer at the input of the device and an analyzer at right angles to the polarizer at the output of the device cause the TOF to pass only light of a certain wavelength. The acoustic wave is of controllable frequency and power, and thereby makes it possible to adjust the wavelength of the light passing through the TOF. An etalon is basically a pair of flat mirrors which partially transmit and partially reflect, and have a small absorption. They are spaced at a distance d apart, parallel to each other. When they are placed in a beam, because of resonance certain wavelengths will be passed through and others will be reflected back.

In what has been described above, the use of a wavelength tunable acousto-optical filter for spectral analysis requires control of the transmission by the filter at wavelengths removed from the transmission peak. This is a result of what is called "sidelobe response" of the TOF and is of the form $$H(\bar{\nu}_o \pm \Delta \bar{\nu}) = \frac{\pi^2 \, sm^2 \frac{1}{2}[\pi^2 + b^2 L^2 \Delta \nu^2]^{1/2}}{\pi^2 + b^2 L^2 \Delta \bar{\nu}^2}$$

where H is the normalized transmission, equal to unity at the central frequency $\bar{\nu}_o$ and $\Delta \bar{\nu}$ is the increment in frequency from $\bar{\nu}_o$. The constant $b^2 L^2$ depends upon the material and geometry of the TOF and is wavelength dependent. For the case of $CaMO_4$ crystals used in the visible region $$b = \frac{3.32 \times 10^{-2} \lambda^2(\mu)}{(\lambda \mu) - 0.28)^2}$$

and $L$ is the crystal length in cm.

The function $H$ does not decrease monatonically away from the central peak $\bar{\nu}_o$ but has a repeating pattern of zero values and local maxima as $\Delta\bar{\nu}$ is increased from zero. The presence of points of zero transmission is useful in suppressing response to frequencies other than $\bar{\nu}_o$ but the nonzero transmission at the local maxima for $\Delta\bar{\nu} \neq 0$ represent an unwanted response.

The zero transmission frequencies can be numbered by n and designated as $$\text{ZEROS } \Delta\bar{\nu} = \frac{\pi}{bL}(4n^2-1)^{1/2}, \, n=1,2,3,....$$

The noncentral maxima can be designated by an integer $m$. They occur at $$\text{SIDELOBE } \Delta\bar{\nu} = \frac{2\pi}{bL}(m(m+1))^{1/2}, \, m=1,2,3,....$$

and have a transmission relative to that at $\bar{\nu}_o$ given by $$\text{PEAK HEIGHT} = \frac{1}{(2m+1)^2}$$

The necessity to suppress these sidelobe responses depends on the details of the spectrum under study and the precision required in its measurement. The suppression can be accomplished in a number of ways, three of which are described below.

I. Cascade Operation of TOF's

The use of two or more TOF's in the optical path, gives an overall response $[H(\bar{\nu}_o \pm \Delta\bar{\nu})]^p$ where there are $p$ TOF's in series. The improvement in response is summarized in the table below where transmission relative to $\bar{\nu}_o$ the central tuned frequency is indicated.

PERCENT TRANSMISSION

|  | 1 TOF | 2 TOF's | 3 TOF's |
|---|---|---|---|
| $\bar{\nu}_o$ | 100 | 100 | 100 |
| 1st Sidelobe | 11.1 | 1.24 | 0.14 |
| 2nd Sidelobe | 4.0 | 0.16 | $6 \times 10^{-3}$ |
| 3rd Sidelobe | 2.0 | 0.04 | $8.5 \times 10^{-4}$ |
| 4th Sidelobe | 1.2 | 0.015 | $1.9 \times 10^{-4}$ |
| 5th Sidelobe | 0.83 | 0.0068 | $5.6 \times 10^{-5}$ |

II. TOF plus Fabry-Perot etalon

By arranging one TOF and one Fabry-Perot etalon in series along the optical path it is possible to have the transmission peak of the TOF coincident with one transmission peak of the etalon. At the same time the adjacent transmission peak of the etalon can be placed in the first zero response frequency of the TOF.

This requires a free spectral range of the etalon $$\Delta\bar{\nu} (F.S.R.) = \frac{\pi \sqrt{3}}{bL}$$

The sidelobes of the TOF then fall between the etalon transmission peaks and the overall response is substantially reduced at the sidelobe frequencies.

For a broad range of frequency scan, since $b$ is wavelength dependent, the etalon should be scanned in length as the central frequency of the TOF is altered, in order to maintain the above F.S.R. relationship.

From the function H it is apparent that for small $n$ (zero number) the spacing between adjacent zeros is not a constant number of $cm^{-1}$. This is different than the peak spacing for the Fabry-Perot which is constant. This means that placing a Fabry-Perot transmission peak in the first TOF zero transmission frequency does not bring about a "peak-zero" match for all TOF zeros. The table below examines the performance of a 6 cm. long TOF and an etalon with a F.S.R. equal to its first zero. A finesse of 50 is assumed for the etalon. The results are for 4500A.

TOF + ONE ETALON (F.S.R. at 1st TOF ZERO)

PERCENT TRANSMISSION

TOF

|  |  |  |
|---|---|---|
| $\bar{\nu}_o$ |  | 100 |
| 1st Sidelobe | 6.365cm$^{-1}$ | $3.6 \times 10^{-2}$ |
| 2nd Sidelobe | 11.025 " | $4.1 \times 10^{-3}$ |
| 3rd Sidelobe | 15.5923 " | 2.0 |
| 4th Sidelobe | 20.129 " | $1.22 \times 10^{-3}$ |

TOF SETS TRANSMISSION PERCENT

F.P.I. max.

|  |  |  |
|---|---|---|
| $\bar{\nu}_o$ |  | 100 |
| 1. F.S.R. = 3.898 cm$^{-1}$ |  | 0.0 |
| 2. F.S.R. = 7.796 cm$^{-1}$ |  | 2.6 |
| 3. F.S.R. = 11.694 cm$^{-1}$ |  | 2.9 |
| 4. F.S.R. = 15.592 cm$^{-1}$ |  | 2.0 |

To overcome the change in TOF "zero's" spacing it is useful to consider setting F.S.R. of etalon at zero $n = 2$ or $n = 3$. For the TOF unit considered, we need etalon

|  | F.S.R. | |
|---|---|---|
|  | 2nd Zero | 3rd Zero |
| 4500A | 8.718 cm$^{-1}$ | 13.318 cm$^{-1}$ |
| 5500A | 14.716 cm$^{-1}$ | 22.479 cm$^{-1}$ |
| 6500A | 19.784 cm$^{-1}$ | 30.221 cm$^{-1}$ |
| 7500A | 23.987 cm$^{-1}$ | 36.641 cm$^{-1}$ |

Length of etalon would be scanned as TOF center frequency $\bar{\nu}_o$ is scanned.

|  |  | Resolution |
|---|---|---|
| 2nd Zero - | = 574$\mu$ to 208$\mu$ | 0.17 – 0.48 cm$^{-1}$ |
| 3rd Zero - | = 375$\mu$ to 137$\mu$ | 0.27 – 0.73 cm$^{-1}$ |

The 3rd zero match looks like a good alternative if etalon length could be easily scanned. At 4500A calculations show

PERCENT TRANSMISSION

|  |  |
|---|---|
| $\bar{\nu}_o$ | 100 |
| 1st Sidelobe | $1.1 \times 10^{-2}$ |
| 2nd Sidelobe | $1.4 \times 10^{-2}$ |
| 3rd Sidelobe | $7.5 \times 10^{-3}$ |
| 4th Sidelobe | $1.2 \times 10^{-3}$ |
| 5th Sidelobe | $3.9 \times 10^{-3}$ |

III. TOF + 2 etalons

Using etalons of different spacing (F.S.R.'s) and a TOF it can be arranged that the transmission peaks of each be at the same $\bar{\nu}_o$ but no substantial overlap occurs for considerable shifts away from $\bar{\nu}_o$. The two etalons can now be of fixed length - and angle tuned in synchronism, eg.

TOF + ETALON 1         + ETALON 2
(F.S.R. = 40 cm$^{-1}$)    (F.S.R. = 25 cm$^{-1}$)

Critical points where one element at least has a maximum transmission are listed below for $\bar{\nu}_o$ corresponding to 4500A and etalon finesse of 50.

RELATIVE PERCENT TRANSMISSION

| | |
|---|---|
| $\bar{\nu}_o$ | 100 |
| 1st Sidelobe | $8.6 \times 10^{-5}$ |
| 25 cm$^{-1}$ | $8.5 \times 10^{-4}$ |
| 40 cm$^{-1}$ | $3.3 \times 10^{-5}$ |

The reduction in transmission away from $\bar{\nu}_o$ is particularly apparent in this example.

The choice of the etalon free spectral ranges will be made to optimize the suppression of TOF sidelobes and etalon subsidiary peaks over the desired total operating range of the instrument.

When using two etalons in the manner described, it is important that the F.S.R.'s thereof be sufficiently different so that they eliminate to the desired degree both the sidelobe signals of the TOF and the wavelengths passed by the two etalons outside the peak areas thereof. On the other hand, it is important for practical reasons, although not essential to the operation, that the etalons coincide after a reasonable range, since this coincidence allows the scanning to be ended and the etalons reset to the original setting, as described in conjunction with the other forms of the device.

BRIEF DESCRIPTION OF THE DRAWINGS

In the drawings:

FIG. 1 shows the diagram of a circuit embodying the invention; FIGS. 1a and 1b are diagrams relating to scanning by tilting the etalon;

FIG. 1c represents a typical Raman Spectrum;

FIGS. 1d and 1e are diagrams explaining the operation of the device of FIG. 1;

FIGS. 1f and 1g show another mode of operation;

FIGS. 2a and 2b illustrate another mode of operation;

FIGS. 3a and 3b show diagrammatically other modes of operation;

FIG. 4 shows a diagram of another modification of the invention;

FIGS. 4a, 4b and 4c are diagrams relating to the operation of FIG. 4;

DESCRIPTION OF THE PREFERRED EMBODIMENTS

Referring now to FIG. 1, there are input optics at 2 for collimating light from a source of unknown wavelength. This light passes to a tunable acousto-optical filter (TOF) 4, and then to an etalon 6. The etalon in this figure is tuned by tilting it in a known way, but the same effect may, as shown in FIG. 4, be achieved by changing the spacing of the mirrors. From the etalon, the light passes to a photo-multiplier tube 8, the electrical signal from which goes to a signal recovery system 10 which receives the signals, and then to a computer or signal averager 12 which stores and records the signal. Of course, in place of the computer there may be an observation device, such as a cathode ray oscilloscope, a meter or other arrangement for display of the desired information.

For a tilted etalon, the transmitted light of a given wavelength passed by the etalon will include a plurality of rays of the same wavelength, such as the ray of wavelength $\lambda_1$ in FIG. 1a. Other wavelengths will be transmitted at other angles, such as along the lines $\lambda_2$ and $\lambda_3$ of FIG. 1a. When such a device is tilted, the wavelength of the light which it will pass in a given direction will depend on the angle at which it is tilted.

With reference to the direction A—A (which is directed to the detector) in FIG. 1a, light of wavelength $\lambda_1$ passes the etalon in direction A—A for this etalon orientation. In FIG. 1b, the etalon has been tilted through an angle $\Delta\theta$. Now light of wavelength $\lambda_2$ passes the etalon in direction A—A. Thus, as the etalon is tilted different wavelengths are passed as a function of the angle of tilt. It is understood that a periodic sequence of wavelengths can pass the etalon in direction A—A simultaneously for each etalon orientation. The sequence is spaced by an F.S.R. or its equivalent in wavelength. However, attention is restricted to those wavelengths within a limited range determined by the passband of the TOF.

In other words, in the form of the invention as shown in FIG. 1, a fixed-spaced etalon will be tilted so that its mirrors change their orientation with respect to the optical axis of the instrument. For operation of the etalon near normal incidence the angle and wavelength tuning are:

$$\Delta\lambda = \frac{2d}{m}\theta\Delta\theta \quad \text{which for } \theta \text{ measured from zero is}$$

$$\Delta\lambda = \frac{2d}{m}(\Delta\theta)^2$$

$$\Delta\bar{\nu} = \frac{m}{2d}\theta\Delta\theta \quad \text{which for } \theta \text{ measured from zero is}$$

$$\Delta\bar{\nu} = \frac{m}{2d}(\Delta\theta)^2$$

where $d$ is the etalon mirror spacing.

$m$ is the etalon order, that is $2d/\lambda$, and $\bar{\nu}=1/\lambda$ is the wavenumber of the coincident passband centers of etalon and TOF.

The tunable acousto-optical filter may be of the type shown in Harris U.S. Pat. No. 3,679,288.

The arrangement described above represents the device in its simplest form.

Figure 6:
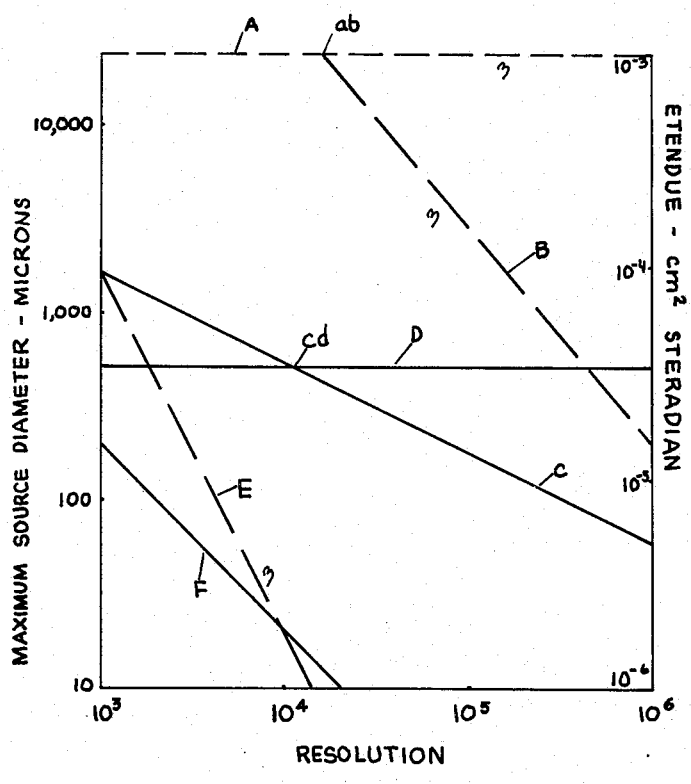
FIG. 6 is an explanatory chart.

Referring now to FIG. 6, this compares the computed etendues for representative components. These are:

1. Acousto-optical filter f/10, 4 mm diameter with $\eta$ a constant.
2. Fabry-Perot interferometer also called etalon with 1 inch diameter circular mirrors and
   $\eta R = 2\pi A$, where R = resolving power, A = area of plates.

3. A monochromator system 0.75 mm f/7 with circular image whose diameter is equal to the slit width. Slit width determines resolution.

In this chart, which assumes an f/1 collection system, the numbers at the left represent the maximum useful diameter in microns of the source; the abscissae represent the resolution; and the numbers at the right represent the etendue in units (Area × Solid Angle) cm² Steradian.

As is designated by the line A at the top of the figure, the etendue of the acousto-optical filter is constant. The line B represents the variation in the etendue of the Fabry-Perot etalon with variation in resolution. It will be noted that this crosses the line A (point $ab$) at a resolution of approximately $1.12$ times $10^4$. The etendue of the whole system will be the lower of the etendues of the two elements, the acousto-optical filter and the etalon, and is represented by the line A to the left of the point of intersection $ab$ and the line B to the right of that point.

The line C represents the diameter of the light source which the etalon will accept while the line D represents the diameter of that which the acousto-optical filter will accept. These are indicated on the left-hand side, diameter in microns. Again the line D to the left of the point of intersection $cd$ and the line C to the right of such point represent the maximum diameter.

The line E represents the etendue of the monochromator and the line F represents the greatest source diameter usable with f/1 optics for such a monochromator.

It will be noted, for example, for a resolution of $10^4$ that the combination tunable optical filter-etalon has a possible source diameter of approximately 450 microns, while the monochromator, for a similar resolution, has a useful source diameter of less than 18 microns. Thus the possible optical throughput of the combination, at a resolution of $10^4$, is roughly 25 squared or 625 times that of the monochromator.

However, as pointed out above, the acousto-optical filter and the etalon must be tuned with relation to each other.

Referring again to FIG. 1, a part of the output from the signal recovery device 10 is passed to the XY recording device 14, whose X input is driven by the sequence control 16. The sequence control also controls through a scanning RF generator 18 the acousto-optical filter 4. Likewise, the sequence control feeds a position control device 20 which varies the position of the etalon in synchronism with the tuning of the optical filter so that the two continue to pass light of wavelengths or frequencies within the same passbands, while scanning over a desired range.

In FIG. 1 the input optics comprise light gathering optics and collimating optics and an optical reject filter 19 if scattered light at the laser wavelength is to be eliminated. The PMT 8 is a photo-multiplier tube or other intensity detector.

It is necessary to restore periodically coincidence between the TOF and the etalon, particularly after resetting both or one of them.

For this purpose, there is provided a sequence control 16, a position control 20, dither generator 24, and lock-in amplifier 22. At the same time, sequence control 16 can energize a source of white light 26, which through a mirror 28 is fed to the input optics 2 for calibrating the filters. Mirror 28 is switched out when the recording of the unknown source is reinitiated.

The position control 20 is a mechanical or electromechanical means of controlling the angular position of the etalon. The a.c. dither generator 24 imparts an a.c. component at a chosen frequency to the tuning circuit of the TOF through the scanning RF generator 18. This a.c. dither modulates the signal from the white light source as detected in the lock-in amplifier to produce a d.c. correction voltage which drives the control to adjust the etalon to maximize throughput of the white light source. In achieving this maximum transmission, the etalon is adjusted to the same $\lambda$ or $\bar{\nu}$ as the TOF. The scanning r.f. generator tunes the TOF and the sequence control initiates scans of the TOF and etalon simultaneously. By computer is meant any further signal processing or storing electronics.

FIGS. 1d and 1e show the time periods of the acousto-optical filter, and the etalon respectively, in the preferred mode of operation.

FIG. 1d shows the center wavelength of the waveband of the TOF, while FIG. 1e shows the wavelength of the etalon. The TOF is increased or decreased in wavelength in small steps, preferably less than the F.S.R. of the etalon. As shown, at the beginning, the TOF center wavelength and the etalon wavelength are the same, and during a certain period of time data is obtained and registered. Thereafter, the TOF is changed in alignment to a different center wavelength, and during the same period the TOF is dithered, with the passage of the white light from 26, and the etalon is gradually adjusted until the etalon and the TOF are in $\lambda, \bar{\nu}$ register. These steps are alternately repeated, and the data obtained is either observed or recorded. Periodically, for operational convenience, as shown at the right-hand of FIG. 1e, the etalon is reset back (or forward) by one or more F.S.R.'s, and the same procedure is repeated.

The TOF is sequenced one step higher or lower by stepping the radio frequency generator. A dither on the r.f. frequency of the TOF is then imposed of a magnitude such that the dither range in $\lambda, \bar{\nu}$ is much less than the TOF passband. With white light from the source passing through the TOF and etalon, lock-in detection of the transmitted white light at the dither frequency is used to correct the etalon setting to bring it into register with the TOF.

Further, the mode of dithering just described is a method for bringing a TOF into register with another narrow passband device such as an etalon, or vice versa.

For Raman spectroscopy applications, using a laser 17 as a light source, a reject optical interference filter 19 is inserted between the input optics and the TOF. The purposes of this filter is to reject the scattered laser light from the Raman sample 21 and to pass the remainder of the light spectrum. If the laser exciting source is changed, then the filter reject band must also be changed. The filter is important for application with a laser where the laser itself is not to be detected but some other spectral feature related to or caused by the laser in conjunction with the sample is to be detected. The reason for this is that the scattered laser light is much stronger than, for example, the Raman spectral feature.

An arrangement of such a type permits the determination of the spectrum of a sample, for example from the Raman effect, such as is shown in FIG. 1c. In other words, as the device scans, the light of different wavelengths, which is present will pass through both the acousto-optical filter and etalon and will be recorded by a suitable arrangement. The TOF and etalon are scanned over one F.S.R. or a chosen fraction thereof after which the scan is terminated. A servo system then realigns the etalon (as required) and resets the etalon to the same λ or $\bar{\nu}$ as the TOF. In the aligning and synchronizing procedures the white light source (WLS) 23 built into the instrument is utilized to provide a reference signal for the alignment of the etalon and establishment of coincident passbands of etalon and TOF. After these procedures have been accomplished the white light source is switched out and another scan of one F.S.R. or fraction thereof is initiated. This sequence of procedures is repeated to cover the entire spectral scan that is desired.

In order to avoid the requirement of too broad an adjustment of the etalon, and because of the recurrence of the signals therefrom, it is only necessary to scan the angle through one F.S.R., although scanning through one or more F.S.R.'s is possible, before resetting to the starting angle.

Another mode of operation (FIGS. 1f and 1g) involves a frequency dithering of the TOF during data taking as well as during the alignment period. However, during data taking the white light source and error amplifiers would not operate. The result of dithering the TOF during data taking is that a derivative of the unknown source spectrum is obtained if the detector output is processed through a lock-in detector. This mode of operation is called Derivative Spectroscopy and is used with other spectroscopic devices (monochromators) by inserting suitable means. Derivative Spectroscopy has special advantages in making weak and narrow spectral features distinguishable from a broad background. This can be especially important in Raman spectroscopy where the laser excites a broad fluorescence from the sample in addition to the narrow Raman feature. Derivative Spectroscopy will accentuate the desired narrow feature from the unwanted broad one. It is also possible to use the same amplifier and lock-in alternately to align the etalon to the TOF during the alignment-synchronization period and for processing the derivative spectrum during the data recording period.

FIGS. 2a and 2b differ from FIGS. 1d and 1e in that the wavelength of the acousto-optical filter is kept constant during successive steps, during the first part of which the etalon is dithered and brought to the same wavelength as the TOF. The etalon is discontinuously stepped or scanned as in FIGS. 2b in one direction until it is necessary to rest it to a different order, but to a wavelength corresponding to the center wavelength to which the acousto-optical filter is adjusted at that time.

FIG. 1c shows the determination of a typical Raman spectrum, from scattered light at the laser wavelength. In this drawing, the scattered light is shown compressed in amplitude by a factor of 100 to 1000. As will be seen, there are various peaks detected, which determine the Raman spectrum of the material being tested.

Another mode of operation is shown in FIGS. 3a and 3b. In these, the center wavelength of the TOF and the wavelength of the etalon are kept the scame, but gradually scan over the F.S.R., after which the etalon is reset by one order, and the alignment is reestablished by dithering one of the filters, in this case the etalon. These steps are then repeated, to produce again a spectrum of the type shown in FIG. 1c.

The arrangement shown in FIG. 4 differs from that of FIG. 1 in that it uses a variable spaced etalon 6' whose mirror separation can be tuned electronically by mounting one mirror on a piezoelectric ceramic or other means and electrically charging the ceramic. The etalon, as described previously has an evenly spaced set of passbands whose wavenumber spacing is the F.S.R. = 1/2d where d is the etalon mirror separation. When d is varied by λ/2 each etalon passband tunes over one F.S.R. so afterwards afters each passband has replaced the one immediately above (below) it is wavenumber.

In fact, the arrangement of FIG. 4 has a piezoelectric crystal 6a which adjusts the length or tuning of the etalon and piezoelectric crystals 6b which adjust the tilt of the mirror, so as to make it parallel to the other mirror, during the alignment period.

Here the a.c. dither generator imposes an a.c. voltage at a chosen frequency or at three different frequencies if desired through PZT voltages control 30 on the three piezoelectric ceramic elements. One element 6a tunes the etalon spacing. The other two elements 6b adjust the angular orientation of one etalon mirror with respect to the other etalon mirror. This dithering action (or actions) imparts (or impart) an a.c. component (or components) to the detected PMT signal with the white light source on. Through the action of the a.c. error amplifiers and lock-in 32, d.c. correction voltages are derived that are fed back to align the etalon and adjust its length to maximize transmission of the white light source through the series combination of TOF and etalon. It is also possible to dither the PZT's 6b and 6c for alignment and to dither the TOF to adjust the wavelength to that set by the spacing of the etalon or to dither the TOF to adjust the etalon to the wavelength of the TOF.

FIGS. 4a, 4b and 4c show one mode of operation of the apparatus of FIG. 4. In these, it will be noted that the wavelength of the acousto-optical filter and the length increment of the etalon corresponds to the wavelength of the acousto-optical filter and the tilting of the etalon in FIGS. 1d and 1e. FIG. 4c shows that the voltage applied to the aligning piezoelectric crystals 6b and 6c are maintained constant during each interval of scanning and then are adjusted by the dither to a value which may be the same as or different from the previous value, but is in any event such as to maintain the parallel relationship between the mirrors or the etalon.

Figure 5A:
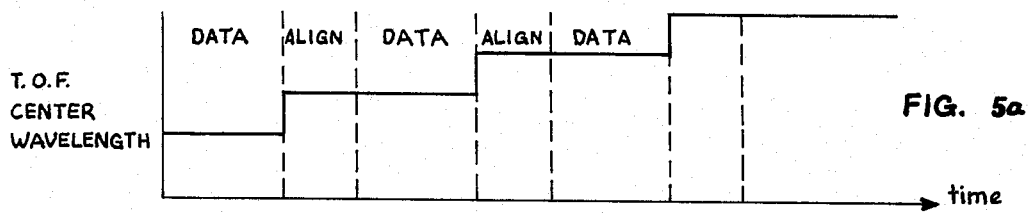
FIGS. 5a, 5b and 5c show diagrams relating to another mode of operation of the device shown in FIG. 4.
Figure 5B:
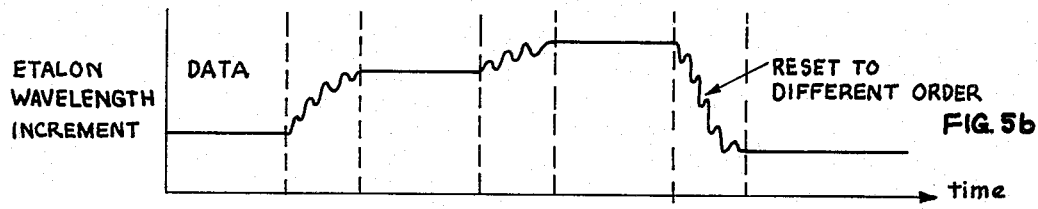
Figure 5C:
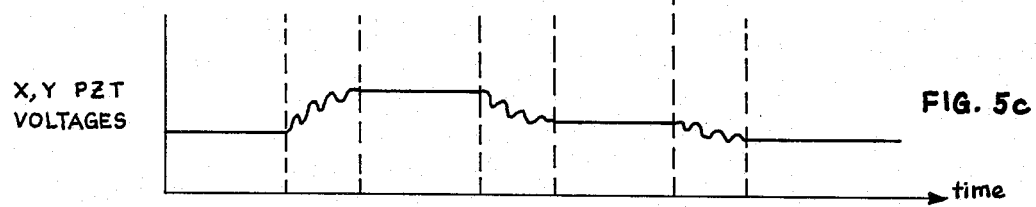

FIGS. 5a, 5b and 5c show the same concept as applied in FIGS. 2a and 2b, but again show the voltages on the alignment crystals 6b in the same manner as in FIG. 3c.

With further reference to FIG. 6, it will be clear that, in the device according to the invention, the light throughput (proportional to η) is 1 to 3 orders of magnitude larger than for a monochromator in the range of resolution usually required for such instrumentation. In usual situations a monochromator system fails to employ as much light scattered from the sample as can be easily selected by the instruments described herein. The performance of the monochromator can in fact be somewhat improved under conditions of high resolution (0.5 cm$^{-1}$) since the image at the slit can be higher than it is wide. It is apparent from the curves that the performance of the new instruments will always have the advantage in light transmitted to the detector, especially at high resolution.

Figure 7:
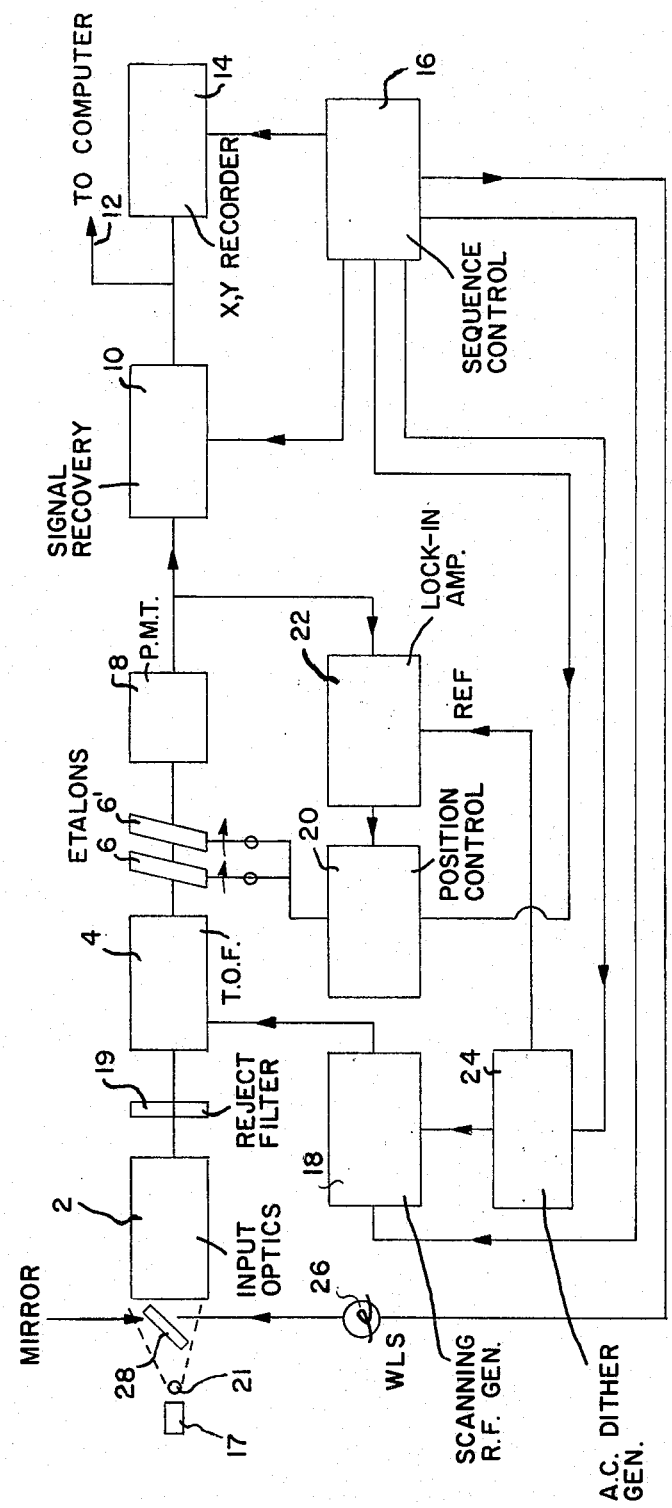
FIG. 7 shows a further modification of the invention utilizing two etalons in series with a TOF.

In the arrangement shown in FIG. 7, there are two etalons, 6' and 6'', controlled in synchronism from the position control 20. These etalons have substantially different free spectral ranges, for example, one of them, 6', may have a free spectral range of 40 cm$^{-1}$, while etalon 6'' has a free spectral range of 25 cm$^{-1}$.

It will be noted that the least common multiple of these two spectral ranges is 200, which is substantially greater than either of the spectral ranges per se. Also, the difference between the free spectral ranges is such that the ranges do not overlap to more than a minor degree except at values markedly different from the basic values, namely in the area of 200 cm$^{-1}$. Thus there is no danger that, within the range in which the device will be operating, the peaks of the two spectral ranges will coincide or overlap, so that transmission from the sidelobes of the TOF and of the etalons is almost completely eliminated.

These results can be assured if, for example, the least common multiple of the free spectral ranges is at least three times that of the greater of the two. Also, for convenience in reducing the extent of scanning necessary before resetting, it is desirable that the least common multiple be no more than ten times the greater of the two ranges.

It may be desirable for some purposes to use two detectors. One of these will detect a signal and the other will serve for the alignment function.

We claim:

1. A spectral analysis device comprising first and second filter means, the first filter means having a single passband and the second filter means having a plurality of spaced passbands, the width of each of which is substantially narrower than the passband of the first filter means, the second filter means being positioned to receive the output of rays from the first filter means, means to register the output from the second filter means, means to tune the first filter means to vary the frequency of light passing there through, and means connected to both said filter means to maintain them to pass the same wavelength through both filter means during at least part of the operation of the device, the distance between the passbands of the second filter means being greater than the width of the passband of the first filter means.

2. A device as claimed in claim 1, in which the first filter means is a acousto-optical filter and the second filter means is a Fabry-Perot etalon.

3. In a device as claimed in claim 1, means for periodically adjusting the second filter means to a different passband of the second filter means.

4. In a device as claimed in claim 3, means for readjusting the first filter means to maintain them at the same wavelength as the second filter means after the second filter means has been changed to a new passband.

5. In a device as claimed in claim 4, said last means comprising means to pass a beam of white light through the first and second filter means, and means to dither one of the filter means to bring it back to its proper tuning.

6. In a device as claimed in claim 1, for raman spectroscopy, and having a laser light source and a sample holder between the laser source and the first filter means, a reject filter for scattered laser light in the optical path.

7. A device as claimed in claim 1, in which the second filter means comprises two Fabry-Perot etalons arranged in series and having substantially different free spectral ranges, the difference between the free spectral ranges being sufficient to eliminate substantially all signals from the side lobes of the first filter means and from the etalons outside the coincident values thereof.

8. In a method of operating a spectral analysis device which device comprises a first filter means comprising an acousto-optical filter and a second filter means having at least one passband positioned to receive the output of rays from the first filter means, the steps of passing rays through the two filter means, periodically varying the two filter means to change the wavelength of rays transmitted therethrough, and periodically passing a beam of white light through the two filter means and simultaneously dithering the first filter means to bring such first filter means into tuning with the second filter means.

9. A method of operating a spectral analysis device comprising first and second filter means, the first filter means having a single passband and the second filter means having a plurality of spaced passbands, the width of each of which is substantially narrower than the passband of the first filter means, the second filter means being positioned to receive the output of rays from the first filter means, means to register the output from the second filter means, means to tune the first filter means to vary the frequency of light passing therethrough, and means connected to both said filter means to maintain them to pass the same wavelength through both filter means during at least part of the operation of the device, the distance between the passbands of the second filter means being greater than the width of the passband of the first filter means, which comprises passing a light of unknown wavelength therethrough, varying simultaneously the wavelengths passed by the first and second filter means over a range, registering the wavelength and intensity of rays passing through the first and second filter means, periodically stopping the variation after not more than one spectral range of the second filter means, passing a white light through the first and second filter means, and dithering at least one of the filter means while the white light is passing therethrough to bring one of the filter means back to its proper tuning with respect to the other filter means.

10. A method as claimed in claim 9, in which the first filter means is varied in steps, and the second filter means is periodically adjusted to pass the light of the wavelength passed by the first filter means at such step.

11. A method of operating a spectral analysis device for derivative spectroscopy, which device comprises first and second filter means, the first filter means having a single passband and the second filter means having a plurality of spaced passbands, the width of each of which is substantially narrower than the passband of the first filter means, the second filter means being positioned to receive the output of rays from the first filter means, means to register the output from the second filter means, means to tune the first filter means to vary the frequency of light passing therethrough, and means connected to both said filter means to maintain them to pass the same wavelength through both filter means during at least part of the operation of the device, the distance between the passbands of the second filter means being greater than the width of the passband of the first filter means, which method comprises at intervals changing the wavelength passed by one of the filter means, maintaining the wavelength passed by such changed filter means substantially constant for a predetermined period, during a part of such period passing white light through both filter means and dithering the changed filter means to bring the other filter means into coincidence with the changed filter means, during another part of such period discontinuing white light and registering the output from the second filter means, and dithering the changed filter means during such other part of the period.

* * * * *